3,509,162
PHENETHYL CARBAMATES
Hedwig Besendorf, Basel, Hans Bruderer, Riehen, and Rudolf Ruegg, Bottmingen, Switzerland, assignors to Hoffmann-La Roche Inc., Nutley, N.J., a corporation of New Jersey
No Drawing. Filed Apr. 20, 1966, Ser. No. 543,787
Claims priority, application Switzerland, Apr. 23, 1965, 5,702/65
Int. Cl. C07c *125/06;* C07d *29/26*
U.S. Cl. 260—294.3                              4 Claims

ABSTRACT OF THE DISCLOSURE

Phenethyl compounds possessing ring as well as side chain substitution, prepared, inter alia, from the corresponding epoxides are described. The end products are useful as muscle-relaxants and anti-convulsants.

---

The present invention relates to novel compounds, novel intermediates and novel processes. More particularly, the present invention relates to novel phenethyl compounds of a type more particularly hereinafter identified, novel intermediates useful in the preparation of such phenethyl compounds and to novel processes for preparing same.

The novel phenethyl derivatives to which the present invention relates are selected from the group consisting of compounds of the formula

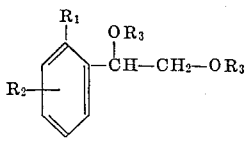

I wherein $R_1$ is selected from the group consisting of halogen and trifluoromethyl; $R_2$ is selected from the group consisting of hydrogen, halogen and trifluoromethyl; $R_3$ is selected from the group consisting of lower alkyl, lower alkenyl, lower alkynyl, $C_3$–$C_6$ cycloalkyl, $C_4$–$C_6$ cycloalkenyl, ar-lower alkyl and a member selected from the aforegoing radicals $R_3$ which is substituted with a member selected from the group consisting of lower alkyl, lower alkoxy, halogen and disubstituted amino and $R_4$ is selected from the group consisting of hydrogen and

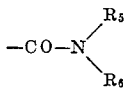

wherein $R_5$ and $R_6$ are, individually, selected from the group consisting of hydrogen, lower alkyl, lower alkenyl, hydroxy-lower alkyl, phenyl, lower alkynyl, $C_3$–$C_6$ cycloalkyl, $C_4$–$C_6$ cycloalkenyl, ar-lower alkyl and pyridyl, which groupings with the obvious exception of hydrogen may be unsubstituted or substituted with a member selected from the group consisting of lower alkyl, lower alkoxy, disubstituted amino and lower alkoxy carbonyl, and, when taken together with the nitrogen atom, represent a 5- or 6-membered heterocyclic ring containing at the most one further hetero atom selected from the group consisting of nitrogen and oxygen, which ring may bear a substituent selected from the group consisting of lower alkyl, phenyl, lower alkoxy, disubstituted amino and lower alkoxy carbonyl.

Preferably, in the Formula I above, $R_1$ is selected from the group consisting of trifluoromethyl, bromine, iodine and most advantageously, chlorine; and $R_2$ is selected from the group consisting of hydrogen, trifluoromethyl, bromine, iodine and most preferentially, chlorine. In a most advantageous aspect of the present invention, $R_2$ is situated in the 4-position on the phenyl ring illustrated in Formula I.

The term, "lower alkyl," as utilized herein is intended to represent branched or straight chain saturated hydrocarbon groups such as methyl, ethyl and isopropyl. Prefentially, the lower alkyl group contains, at the most, four carbon atoms. The term "lower alkenyl" as found herein represents a mono-unsaturated branched or straight chain hydrocarbon group, preferentially, containing at the most four carbon atoms, such as allyl. The term "lower alkynyl," represents a group such as propynyl (e.g. propargyl) and the like and preferentially contains no more than four carbon atoms. By the term "$C_3$–$C_6$ cycloalkyl," as used throughout the instant disclosure and claims, groupings such as cyclopropyl, cyclobutyl, cyclohexyl and the like are intended. The term "$C_4$–$C_6$ cycloalkenyl" connotes a group such as cyclohexen-(1)-yl and the like. The expression "ar-lower alkyl" represents a grouping such as preferably, phenyl-lower alkyl (e.g. benzyl), either unsubstituted or substituted on the phenyl moiety and/or on the alkyl moiety with one or more substituents. The above groupings can be substituted, if desired, where appropriate with one or more lower alkyl groups, preferentially containing up to four carbon atoms such as methyl, ethyl and the like, by one or more lower alkoxy groups, preferentially, having at the most four carbon atoms such as methoxy, ethoxy, and the like, by disubstituted amino groups (i.e. tertiary amino groups), such as di-lower alkyl amino groups, preferably containing no more than six carbon atoms in total in the group, e.g. dimethylamino, diethylamino, and the like, and saturated heterocyclic amino groups such as piperidyl (piperidino, for example) or by halogen atoms, such as chlorine, bromine and iodine. Illustrative of such substituted groupings suitable for the purposes of the present invention are, for example, a lower alkyl group substituted with lower alkoxy, e.g. methoxy propyl, cycloalkyl substituted with one or more lower alkyl groups, e.g. 2,6,6-trimethylcyclohexyl, lower alkoxy-ar-lower alkyl e.g. di-methoxyphenethyl, di-lower alkyl-amino-ar-lower alkyl e.g. p-dimethylaminobenzyl, o-halo-ar-lower alkyl e.g. o-chlorophenethyl and the like. By the term "aryl" (ar) and the like, an aromatic group such as phenyl is intended.

As is indicated above, $R_5$ and $R_6$, when individual radicals, represent hydrogen or straight or branched chain lower alkyl, lower alkenyl and lower alkynyl groupings, $C_3$–$C_6$ cycloalkyl, $C_4$–$C_6$ cycloalkenyl, phenyl, hydroxylower alkyl and ar-lower alkyl wherein these terms have the same significances as set out above; and $R_5$ and $R_6$, when taken together, are divalent groups, which together with the nitrogen atom to which they are attached, form a 5- or 6-membered mono-heterocyclic ring structure such as piperazinyl, piperidyl (1, 2 and 3), pyrrolidinyl, morpholinyl and substituted derivatives thereof. For example, when the monoheterocyclic ring structure includes an additional nitrogen atom, such nitrogen atom may have joined thereto a member selected from the group consisting of lower alkyl, lower alkoxy and lower alkoxy carbonyl or the heterocyclic ring structure can be substituted with a disubstituted tertiary amino group.

In a preferred aspect, the ring structure is saturated and thus, $R_5$ and $R_6$, when taken together with the nitrogen atom represent a member selected from the group consisting of N-lower alkyl-piperazinyl, N-lower alkoxy-piperazinyl, N-lower alkoxy-carbonyl-piperazinyl, pyrrolidinyl, piperazinyl, morpholinyl and piperidyl. Accordingly, it should be apparent from the above that when $R_5$ and $R_6$ are taken together, they may represent, for example, a lower alkylene chain such as a polymethylene chain of four or five carbon atoms, a lower alkylene-oxylower alkylene grouping, an N-$R_{10}$-lower alkylene-aza-lower alkylene grouping wherein $R_{10}$ is selected from the group consisting of lower alkyl, lower alkoxy, lower alkoxy-carbonyl and hydrogen.

An especially advantageous group of phenethyl derivatives included within the purview of the present invention are of the formula

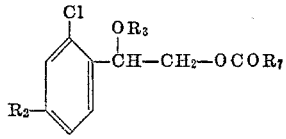

II wherein $R_2$ is selected from the group consisting of hydrogen and chlorine; $R_3$ is selected from the group consisting of lower alkyl, lower alkynyl and lower alkenyl, each grouping having no more than four carbon atoms, and $R_7$ is selected from the group consisting of lower alkylamino, lower alkenyl amino, lower alkynyl amino, each grouping containing at the most four-carbon atoms and 1-piperidyl (piperidino). In the most advantageous embodiment of the present invention, $R_2$ in compounds of the Formula II is chlorine.

The novel compounds of the Formula I above and the Formula II above may be prepared by a wide variety of reaction routes. In one of such routes, a compound of the formula

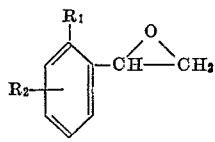

III wherein $R_1$ and $R_2$ have the same significance as ascribed thereto hereinabove is reacted with an alcohol of the formula $$R_3OH \qquad IV$$

wherein $R_3$ has the same meaning as ascribed thereto hereinabove in the presence of an acidic catalyst whereby to prepare a compound of the Formula I above wherein $R_4$ is hydrogen, i.e. a compound of the formula

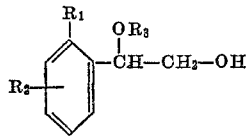

IV wherein $R_1$, $R_2$ and $R_3$ have te same significance as above.

As is evident from the above, the acid-catalyzed ring-opening of the epoxides of Formula III above to the corresponding compounds of the Formula V above is effected in the presence of an acidic agent. Among the acidic agents suitable for the purposes of the present invention, there may be included aprotic acids such as Lewis acids, e.g. boron trifluoride, aluminum chloride and the like, proton-donating strong mineral acids, such as, for example, hydrochloric acid, sulfuric acid, phosphoric acid, perchloric acid and the like, organic sulfonic acids such as, for example, p-toluene sulfonic acid, and carboxylic acids such as lower alkanoic acids, e.g. acetic acid, formic acid and the like. In a preferred process aspect, the epoxide is added to an excess of the alcohol of the Formula IV above and with stirring catalytic quantities of the desired acid agent is added. An especially advantageous acidic agent for the purposes of the present invention is boron trifluoride when in the form of its etherate. Preferably, the ring opening of the epoxide of the Formula III above is conducted at a temperature range of from about 20° C. to about 50° C. preferably in the presence of an organic solvent.

The epoxides of Formula III above utilized as a starting material in the process of the present invention can be prepared, for example, by treating the correspondingly-substituted chloroacetophenone with a complex metal hydride (e.g. with sodium borohydride and the like) whereby to obtain a phenylethylene-chlorohydrin and the so-prepared chlorohydrin is then converted into the corresponding epoxide of the Formula III above by dehydration in the presence of any suitable dehydrating agent such as potassium hydroxide.

Another preparative route to the compounds of Formula V above involves reducing a compound of the formula

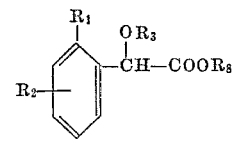

VI wherein $R_8$ is selected from the group consisting of hydrogen and lower alkyl and $R_1$, $R_2$ and $R_3$ are as above whereby to obtain a compound of the Formula V above.

Compounds of the Formula VI above may be prepared by treating the correspondingly-substituted benzaldehyde with hydrocyanic acid, whereby to obtain a cyanohydrin, hydrolyzing the so-formed cyanohydrin by saponification techniques, and then subjecting the alcohol group of the hydroxy-acid so-obtained to etherification techniques.

The reduction of the compounds of Formula VI above to the corresponding compounds of the Formula V above is conveniently effected with any suitable reducing agent capable of effecting this end. Preferred among the many reducing agents suitable for the purposes of the present invention are complex metal hydrides. Representative of complex metal hydrides are lithium aluminum hydride and the like. Preferentially, when $R_8$ in compounds of the Formula VI above is lower alkyl, there is contained no more than four carbon atoms in the hydrocarbon chain which, as is noted above, is preferentially the case whenever the term "lower alkyl" is utilized throughout the present disclosure.

Compounds of the Formula V above can be converted into compounds of the Formula I above wherein $R_4$ is

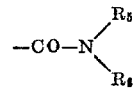

i.e. compounds of the formula

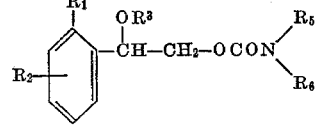

VII wherein $R_1$, $R_2$, $R_3$, $R_5$ and $R_6$ are as above, by a wide variety of preparative procedures. For example, the alcohols of the Formula V above can be converted into their chlorocarbonate derivatives by the reaction thereof with phosgene in the presence of an acid-binding agent such as pyridine, dimethylaniline, antipyrine and the like, the acid-binding agent serving to accept the hydrochloric acid formed during the ensuing reaction. The chlorocarbonates thus obtained can be converted into the carbamates of the Formula VII above via the reaction of the said chlorocarbonates with compounds of the formula

wherein $R_5$ and $R_6$ have the same meaning as ascribed thereto heinabove i.e. ammonia or the appropriately substituted amine. Suitably, the conversion of the chlorocarbonates into the carbamates can be effected in the presence of an inert organic solvent. Representative of solvents suitable for the purposes of the present invention are ethers, e.g. diethyl ether and the like.

Compounds of the Formula I above wherein $R_4$ is hydrogen, i.e. the phenethyl alcohols of the Formula V above, can also be converted into compounds of the Formula I above wherein $R_4$ is a

grouping via the reaction of the corresponding alcohol with urea or an appropriately-substituted derivative thereof or with a carbamic acid chloride, or with a carbamic acid ester in the presence of a re-esterification catalyst (such as, for example, aluminum isopropylate). Furthermore, the phenethyl alcohols of the Formula V above can also be converted into the carbamates of the Formula VII above by treatment with an alkali cyanate in the presence of an inert organic solvent such as benzene or methylene chloride and an organic acid such as, for example, trichloro acetic acid, trifluoro acetic acid and the like.

The phenethyl derivatives of Formula I prepared in accordance with the process aspects of the present invention are muscle-relaxant agents. Such compounds also are anticonvulsant agents. More particularly, 2,4-dichloro-$\beta$-methoxy-phenethyl-carbamate, 2,4 - dichloro-$\beta$-methoxy-penethyl N - isopropyl - carbamate, 2,4 - dichloro - $\beta$-methoxy-penethyl N-allyl-carbamate and 2,4-dichloro-$\beta$-methoxy-penethyl 1-piperidine-carboxylate are especially efficacious as muscle-relaxant agents.

2,4-dichloro-$\beta$-(2-propynyloxy)-phenethyl N-isopropyl-carbamate and 2,4-dichloho-$\beta$-(2-propynyloxy)-phenethyl-1-piperidyl carboxylate are, in addition to being efficacious muscle-relaxant agents, also anticonvulsants.

The compounds of the Formula I above can be administered internally for example, parenterally or enterally, in conventional pharmaceutical dosage forms with the dosage adjusted to meet the exigencies of a particular therapeutic situation. For example, they can be incorporated in conventional, liquid or solid vehicles such as, for example, water, gelatin, lactose, starch, magnesium stearate, talc, vegetable oils, gums, polyalkyleneglycols, Vaseline and the like to provide elixirs, tablets, dragees, suppositories, capsules, powders and the like, according to acceptable pharmaceutical practices. They may contain additives, such as preserving, stabilizing, wetting or emulsifying agents, salts for varying the osmotic pressure or buffers and the like. They may be combined with other therapeutically valuable compounds.

The following examples are illustrative but not limitative of the present invention. All temperatures are stated in degrees centigrade.

EXAMPLE 1

100 g. of 1-epoxyethyl-2,4-dichlorobenzene are dissolved in 100 ml. of methanol abs. and treated with 3 drops of boron trifluoride etherate solution. A spontaneous exothermic reaction sets in. The resultant reaction mixture is stirred for ½ hour at a water-bath temperature of 40° under anhydrous conditions and thereafter the excess solvent is distilled off. The oily residue is added to 500 ml. of methylene chloride, the resultant medium is washed twice with 10 ml. of water (2×), dried over magnesium sulphate and the solvent is distilled off leaving an oil. The oil so-obtained is added to 100 ml. of petroleum ether (low boiling). The resultant combination is maintained at 0° for 3 hours and then white crystals of 2-methoxy-2-(2,4-dichlorophenyl)-ethanol, M.P. 54–55° which appear are separated by filtration.

A solution of 160 g. of phosgene in 1.5 l. of toluene is cooled to −5° and carefully added while maintaining the temperature at −5° to a solution of 304 g. of antipyrine and 358 g. of 2-methoxy-2-(2,4-dichlorophenyl)-ethanol in 500 ml. of benzene abs. The resultant reaction medium is stirred overnight at room temperature. It is further stirred at 40° for an additional 2 hours and the precipitate which separates (antipyrine hydrochloride) is removed by filtration with suction. The precipitate is rinsed once with 200 ml. of benzene abs. and the rinse added to the filtrate. The filtrate is then evaporated in a water-jet vacuum. The residue is added to 1 l. of methylene chloride (2×). The insoluble portion is separated by filtration and added also to 1 liter of methylene chloride. The methylene chloride mediums are combined, washed with 50 ml. of a 1 N hydrochloric acid solution (2×), washed neutral with water, dried over magnesium sulphate and the solvent distilled off in water-jet vacuum whereby oily 2,4-dichloro-$\beta$-methoxy phenethyl-chloro carbonate is obtained. To the oil, there is carefully added with stirring and ice-cooling, 500 ml. of a conc. ammonia solution. The excess ammonia solution is distilled off in water-jet vacuum, the residue is added to methylene chloride, the methylene chloride phase is washed neutral with water, dried over magnesium sulphate and concentrated. Upon recrystallization from methylene chloride-petroleum ether, there is obtained 2,4-dichloro-$\beta$-methoxy-phenethyl carbamate as white crystals; melting point 112–113°.

1-epoxyethyl-2,4-dichloro-benzene can be prepared as follows: 735 g. of m-dichlorobenzene are added to 900 ml. of chloroacetyl chloride and to the resultant mixture, 800 g. of aluminum chloride is carefully added over a period of 30 min. with stirring. The mixture is then stirred for an additional 3 hours at an oil-bath temperature of 50°, cooled to 10° and slowly poured with vigorous stirring on 5 kg. of ice-water. The resultant mixture is stirred for 30 min. and then extracted with 3 l. of methylene chloride. The organic phase is washed with 250 ml. of water 3×, once with 250 ml. of 3 N caustic soda and subsequently washed neutral with water. After drying over magnesium sulphate, the solvent is distilled off and the colorless oil obtained distilled (boiling point: 149–155°/15 mm.). After adding the oil to 3 l. of petroleum ether (low boiling) with stirring and cooling to 0°, there crystallizes 2,4-dichlorophenyl-$\omega$-chloroacetophenone in the form of white crystals, M.P. 54–55°.

500 g. of 2,4-dichlorophenyl-$\omega$-chloroacetophenone is dissolved in 3 l. of dioxan and the resulting solution heated to 50.° It is then carefully added at this temperature over a period of 30 min. with stirring to a solution of 85 g. of sodium borohydride in 150 ml. of water carefully so as to assure that the temperature does not rise above 50°. The mixture is then stirred at the 50° temperature for 3 hours, cooled and the solvent distilled off in water-jet vacuum. The residue is added to 500 ml. of water and shaken out 3 times with 1.5 l. of ether. After washing neutral with water and drying over magnesium sulfate, the solvent is distilled off leaving 2,4-dichloro-phenyl-ethylene chlorohydrin as a uniform oil which is reacted immediately without further purification. A sample however is crystallized from petroleum ether (low boiling), giving the chlorohydrin as white crystals of melting point 50–51°.

564 g. of the unpurified chlorohydrin obtained above are added with vigorous stirring to a solution of 169 g. of potassium hydroxide in 4 l. of water. The resultant reaction medium is then stirred at 50° for 1 hour. After cooling, the reaction product is taken up in 3 l. of ether (2×), the ethereal solutions are combined, washed neutral with water, dried over magnesium sulfate and the solvent is distilled off leaving 1-epoxyethyl-2,4-dichloro-benzene as a colorless oil which distills at 109–111°/7 mm.; $n_D^{23}=1.5647$.

Utilizing a similar method as set out in connection with the preparation of 2,4-dichloro-$\beta$-methoxy-phenethylcarbamate, the following compounds were prepared: 2,4 - dichloro-$\beta$-pentyloxy-phenethyl-N-isopropylcarbamate of melting point 53–54° (from petroleum ether, medium boiling); 2,4-dichloro-β-benzyloxy-phenethyl-N-isopropylcarbamate of melting point 96–97° (from petroleum ether, medium boiling) and 2,4-difluoro-β-methoxy-phenethyl-N-isopropylcarbamate of melting point 99–100°/0.04 mm., $n_D^{23}$=1.4772; M.P. 53°.

EXAMPLE 2

50 g. of 1-epoxyethyl-2,4-dichlorobenzene are dissolved in 50 ml. of methanol abs. and treated with 2 drops of conc. sulfuric acid. The resultant medium is stirred at a water-bath temperature of 40° for 1 hour, treated with 4 drops of conc. caustic soda and the excess solvent concentrated in a water-jet vacuum. Utilizing the purification procedure set forth in Example 1, there is obtained 2-methoxy-2-(2,4-dichlorophenyl)-ethanol as white crystals of melting point 54–55°.

22.1 g. of 2-methoxy-2-(2,4 - dichlorophenyl)-ethanol are dissolved in 250 ml. of benzene abs. and, after treatment with 13.2 g. of sodium cyanate, 22.8 g. of trifluoroacetic acid are slowly added dropwise with stirring. After stirring for 3 hours, the benzene phase is washed twice with 20 ml. of water, dried over magnesium sulfate and the solvent distilled off. The residue crystallizes on sprinkling with petroleum ether (low boiling) yielding white crystals of 2,4-dichloro-β-methoxy-phenethyl carbamate of melting point 112–113°.

EXAMPLE 3

22.1 g. of 2-methoxy-2-(2,4 - dichlorophenyl)-ethanol are treated with 6 g. of urea and held at an oil bath temperature of 180° for 3 hours. After cooling the reaction mixture, the residue is extracted with 100 ml. of petroleum ether (medium boiling) (2×). After concentration of the solvent to 30 ml. and allowing it to stand with ice-cooling overnight, there crystallizes 2,4-dichloro-β-methoxy-phenethyl carbamate as white crystals of melting point, 112–113°.

EXAMPLE 4

A mixture of 22.1 g. of 2-methoxy-2-(2,4-dichlorophenyl)-ethanol, 10.8 g. of dimethylcarbamyl chloride and 50 ml. of pyridine are refluxed over a period of 3 hours. After distilling off the excess solvent, the residue is taken up in methylene chloride, the methylene chloride solution is washed neutral, the solvent dried over magnesium sulfate and concentrated. The residue crystallizes after treatment with petroleum ether (medium boiling) yielding 2,4 - dichloro-β-methoxy-phenethyl N-dimethylcarbamate as white crystals of melting point 48–49°.

EXAMPLE 5

22.1 g. of 2 - methoxy - 2-(2,4-dichlorophenyl)-ethanol and 26 g. of N-allyl-carbamic acid ethyl ester are dissolved in 250 ml. of toluene. 500 mg. of aluminum isopropylate is then added and the resultant medium is stirred at an oil-bath temperature of 170°. The alcohol formed in the reaction is distilled off azeotropically with the solvent. After distilling off the solvent, the oil obtained is distilled at high vacuum yielding 2,4-dichloro-β-methoxy-phenethyl N-allyl-carbamate of boiling point 145–146°/0.02 mm.; $n_D^{22}$=1.5630.

EXAMPLE 6

11.9 g. of phenyl isocyanate are dissolved in 50 ml. of benzene abs. and the resulting solution is added dropwise with stirring to a solution of 22.1 g. of 2-methoxy-2-(2,4-dichlorophenyl)-ethanol in 50 ml. of benzene abs. The resultant reaction medium is stirred at a temperature of 80° overnight. After cooling, the benzene solution is washed with water, dried over magnesium sulfate and the solvent distilled off. After treatment of the oily residue with 50 ml. of petroleum ether (medium boiling) and allowing the so-treated residue to stand in the cold, there crystallizes 2,4-dichloro-β-methoxy-phenethyl N-phenylcarbamate as white crystals, melting point 77–78.5°.

EXAMPLE 7

1-epoxyethyl - 2,4 - dichlorobenzene is reacted with ethanol in the manner described in Example 1 giving 2-ethoxy-2-(2,4 - dichlorophenyl)-ethanol of boiling point 149–153°/10 mm.; $n_D^{23}$=1.5412. As in Example 1, the so-formed product is converted into 2,4-dichloro-β-ethoxy-phenethyl carbamate of melting point 70–70.5° (after recrystallization from ether/petroleum ether).

EXAMPLE 8

1-epoxyethyl - 2,4 - dichlorobenzene is reacted with isopropyl alcohol in the manner described in Example 1, giving 2-isopropoxy - 2 - (2,4-dichlorophenyl)-ethanol of boiling point 148–151°/9 mm.; $n_D^{23}$=1.5261. As in Example 1, the so-formed product is converted with ammonia into 2,4 - dichloro-β-isopropoxy-phenethyl carbamate of melting point 95° (after recrystallization from ether/petroleum ether).

EXAMPLE 9

1-epoxyethyl-2,4-dichlorobenzene is reacted with allyl alcohol in the manner described in Example 1 yielding 2-allyloxy - 2 - (2,4-dichlorophenyl)-ethanol of boiling point 155–158°/10 mm.; $n_D^{22}$=1.5468. Also as in Example 1, the so-formed product is converted with ammonia into 2,4 - dichloro-β-allyloxy-phenethyl carbamate of melting point 82–83° (after recrystallization from ether/petroleum ether).

EXAMPLE 10

1-epoxyethyl-2,4-dichlorobenzene is reacted with propargyl alcohol in the manner described in Example 1 yielding 2-propynyloxy - 2 - (2,4-dichlorophenyl)-ethanol, B.P. 119–122°/0.01 mm.; $n_D^{22}$=1.5561. Also as in Example 1, but utilizing isopropylamine rather than ammonia, the so-formed product is converted into 2,4-dichloro-β-(2 - propynyloxy)-phenethyl-N-isopropylcarbamate, melting point 60°, after recrystallization from petroleum ether.

EXAMPLE 11

2-propynyloxy - 2 - (2,4-dichlorophenyl)-ethanol is reacted with piperidine rather than ammonia in the manner described in Example 1 whereby 2,4-dichloro-β-(2-propynyloxy)-phenethyl-1-piperidine carboxylate as an oil is obtained. The product decomposes upon distillation; $n_D^{22}$=1.5421.

EXAMPLE 12

1-epoxyethyl - 2,4 - dichlorobenzene is reacted with phenethyl alcohol in the manner described in Example 1, giving 2 - phenethoxy - 2 - (2,4-dichlorophenyl)-ethanol of melting point 64–64.5° (after recrystallization from petroleum ether medium boiling). Also as in Example 1, the so-formed product is converted into 2,4-dichloro-β-phenethoxy-phenethyl N-isopropyl-carbamate of melting point 103–104° (after recrystallization from petroleum ether, medium boiling).

EXAMPLE 13

1-epoxyethyl-2,4-dichlorobenzene is reacted with 2-methoxyethanol in the manner described in Example 1 to give 2-(2 - methoxyethoxy) - 2-(2,4-dichlorophenyl)-ethanol B.P. 116°/0.05 mm.; $n_D^{22}$=1.5367. The so-formed product is converted also in the manner described in Example 1 into 2,4-dichloro-β-(2-methoxyethoxy)-phenethyl-N-isopropyl-carbamate which has a melting point of 45–55°, after recrystallization from petroleum ether (medium boiling).

EXAMPLE 14

1-epoxyethyl-2,4-dichlorobenzene is treated with 3,4-dimethoxyphenethanol in the manner described in Example 1. In this manner, there is obtained 2-[(3,4-dimethoxyphenethyl)oxy] - 2-(2,4-diclorophenyl)-ethanol of boiling point 180°/0.05 mm.; $n_D^{22}$=1.5758.

EXAMPLE 15

In the manner described in Example 1, starting with 2-methoxy-2-(2,4-dichlorophenyl)-ethanol, but utilizing methylamine rather than ammonia, there is obtained 2,4-dichloro-β-methoxy-phenethyl N-methyl-carbamate of melting point 73–74° (from petroleum ether, medium boiling).

EXAMPLE 16

In the manner described in Example 1, starting with 2-methoxy-2-(2,4-dichlorophenyl)-ethanol, but utilizing isopropylamine rather than ammonia, there is obtained 2,4-dichloro-β-methoxy-phenethyl N-isopropyl-carbamate of melting point 47–49° (from petroleum ether, low boiling).

EXAMPLE 17

In the manner described in Example 1, starting with 2-methoxy-2-(2,4-dichlorophenyl)-ethanol, but utilizing tertiary butylamine in place of ammonia, there is obtained 2,4-dichloro-β-methoxy-phenethyl N-tertiary butyl-carbamate of boiling point 125–128°/0.04 mm.; $n_D^{22}=1.5212$.

EXAMPLE 18

In the manner described in Example 1, starting with 2-methoxy-2-(2,4-dichlorophenyl)-ethanol, but utilizing benzylamine rather than ammonia, there is obtained 2,4-dichloro-β-methoxy-phenethyl N-benzyl-carbamate of boiling point 155°/0.04 mm.; $n_D^{22}=1.5637$.

EXAMPLE 19

In the manner described in Example 1, starting with 2-methoxy-2-(2,4-dichlorophenyl)-ethanol, but utilizing phenethyl amine in place of ammonia, there is obtained 2,4-dichloro-β-methoxy-phenethyl N-phenethyl-carbamate of boiling point 160–162°/0.04 mm.; $n_D^{22}=1.5595$.

EXAMPLE 20

In the manner described in Example 1, starting with 2-methoxy-2-(2,4-dichlorophenyl)-ethanol, but utilizing 3,4-dimethoxy-phenethyl amine in place of ammonia, there is obtained 2,4-dichloro-β-methoxy-phenethyl-N-(3,4-dimethoxy-phenethyl)-carbamate of melting point 92° (from petroleum ether, medium boiling).

EXAMPLE 21

In the manner described in Example 1 starting with 2-methoxy-2-(2,4-dichlorophenyl)-ethanol, but utilizing 4-phenylpiperazine in place of ammonia, there is obtained 2,4-dichloro-β-methoxy-phenethyl-4-phenyl-1-piperazine-carboxylate of melting point 68–69° (from petroleum ether, medium boiling).

EXAMPLE 22

In the manner described in Example 1, starting with 2-methoxy-2-(2,4-dichlorophenyl)-ethanol, but utilizing β-hydroxyethyl amine in place of ammonia, there is obtained 2,4-dichloro-β-methoxy-phenethyl N-(β-hydroxyethyl)-carbamate of boiling point 176–177°/0.05 mm.; $n_D^{22}=1.5450$.

EXAMPLE 23

As in Example 1, starting from 2-methoxy-2-(2,4-dichlorophenyl)-ethanol, but utilizing morpholine rather than ammonia, there is obtained 2,4-dichloro-β-methoxy-phenethyl-4-morpholine-carboxylate of melting point 47–48° (from petroleum ether, medium boiling).

EXAMPLE 24

50 g. of oily 2,4-dichloro-β-methoxy-phenethyl-chlorocarbonate (obtained according to Example 1) are dissolved in 250 ml. of ether and treated with stirring with a solution of 30.1 g. of piperidine in 250 ml. of ether. The resultant mixture is thereafter stirred at an oil-bath temperature of 40° for 3 hours. The precipitate which forms is filtered off by suction, the filtrate shaken with 50 ml. of a 1 N hydrochloric acid solution, washed neutral and dried over magnesium sulfate. The solvent is then distilled off yielding 2,4-dichloro-β-methoxy-phenethyl-1-piperidine-carboxylate which distills at 135–140°/0.04 mm.; 47.2 g.; $n_D^{22}=1.5377$.

EXAMPLE 25

To a solution of 50 g. of 2,4-dichloro-β-methoxyphenethyl-chlorocarbamate in 500 ml. of benzene abs. there is added with stirring, a solution of 35.4 grams of N-methyl-piperazine in 250 ml. of benzene and the resultant reaction medium agitated at a temperature of 50°. The resultant mixture is cooled and then filtered whereby (2,4-dichloro-β-methoxy phenyl)-4-methyl-1-piperazine carboxylate is obtained boiling at 150–153°/0.04 mm. Upon recrystallization with low boiling petroleum ether, the product appeared as white crystals, M.P. 59°.

EXAMPLE 26

Starting from 2-methoxy-2-(2,4-dichlorophenyl)-ethanol, in the manner described in Example 1, but utilizing N-carbethoxypiperazine rather than ammonia, there is obtained ethyl 2,4-dichloro-β-methoxy-phenethyl 1,4-piperazine-dicarboxylate of boiling point 185–190°/0.06 mm.; $n_D^{22}=1.1355$; melting point 65.5–66.5° (after recrystallization from medium boiling petroleum ether).

EXAMPLE 27

A solution of 10 g. of 2,4-dichloro-α-methoxy-phenyl-acetic acid (M.P. 115°) in 100 ml. of abs. tetrahydrofuran is carefully added under a nitrogen atmosphere to a suspension of 5 g. of lithium aluminum hydride in 100 ml. of abs. ether and the resultant mixture is stirred overnight at an oil-bath temperature of 60°. After cooling to 0°, the excess lithium aluminum hydride is decomposed by adding dropwise an aqueous tetrahydrofuran solution (1:1). The so-formed medium is treated with stirring with 10 g. of potassium carbonate, the precipitate is filtered off by suction, rinsed 3 times with 50 ml. of ether each time and the organic phase distilled off in a water-jet vacuum. The resulting residue crystallizes on sprinkling with petroleum ether (low boiling) yielding 2-methoxy-2-(2,4-dichlorophenyl)-ethanol as white crystals of melting point 54–55°.

EXAMPLE 28

A solution of 42 g. of o-chloro-α-methoxy-mandelic acid in 600 ml. of abs. tetrahydrofuran is carefully added under a nitrogen atmosphere to a suspension of 16 g. of lithium aluminum hydride in 150 ml. of abs. ether. The reaction mixture is stirred overnight at an oil-path temperature of 60°. After cooling to 0°, the excess lithium aluminum hydride is decomposed by dropwise addition of an aqueous tetrahydrofuran solution (1:1). The resulting medium is treated with 20 g. of potassium carbonate, the precipitate is filtered off by suction and rinsed 3 times with 100 ml. of ether each time. The organic phase is distilled off in a water-jet vacuum. The residue is taken up in 500 ml. of ether, washed with 3 N caustic soda and subsequently washed neutral with water, dried over magnesium sulfate and the solvent distilled off in water-jet vacuum. There is obtained thusly a colorless oil, boiling point 119–120°/9 mm., which crystallizes after sprinkling with petroleum ether (low boiling). After recrystallization from petroleum ether (medium boiling), there is obtained 2-methoxy-2-(o-chlorophenyl)-ethanol as white crystals of melting point 50.5–51.5°.

The last-mentioned product is converted in the manner described in Example 1 with ammonia into 2-chloro-β-methoxy-phenethyl carbamate of melting point 104–105° (from ether/petroleum ether).

o-Chloro-α-methoxy-mandelic acid was prepared as follows: 60 g. of o-chlorobenzaldehyde are added to a solution of 60 g. of sodium pyrosulfite in 120 ml. of water and 400 ml. of ether. The resulting medium is vigorously shaken for 30 min. The precipitate obtained is filtered off by suction, rinsed with 3× 100 ml. of ether and subsequently dissolved in 2 l. of water. The so-formed solution is added with vigorous stirring over a period of 30 min. to a solution of 50 g. of sodium cyanide in 200 ml. of water. After this addition was completed, the resultant medium is shaken out with 2× 1 l. of ether. The ethereal solution is washed neutral, dried over magnesium sulfate and the solvent distilled off. The residue obtained is dissolved in 400 ml. of hydrochloric acid (conc.) and stirred at 80° for 4 hours. After distilling off the hydrochloric acid in water-jet vacuum, the residue obtained is taken up in methylene chloride and, by addition of petroleum ether, treated up to turbidity. The white crystals obtained are recrystallized from methylene chloride/petroleum ether, giving o-chloro-mandelic acid, melting point 83–84°.

40.5 g. of o-chloro-mandelic acid are dissolved in a solution of 57.75 g. of caustic soda in 200 ml. of water. 75.5 g. of dimethyl sulfate (freshly distilled) are then added dropwise at 45° over a period of 30 min. with stirring. The so-obtained medium is then held at this temperature for 1 hour, treated with 500 ml. of water and, with cooling, made congo-acid by the addition of 3 N hydrochloric acid. The methoxy-acid is then taken up in 2× 1 l. of ether, the ethereal solution is washed neutral with water, dried over magnesium sulfate and the solvent distilled off. The precipitating crystals are recrystallized once from water yielding o-chloro-α-methoxy-mandelic acid of melting point 81–82°.

EXAMPLE 29

In the manner described in Example 1, 2-methoxy-2-(o-chloro-phenyl)-ethanol, is converted with isopropylamine into 2-chloro-β-methoxy-phenethyl N-isopropyl-carbamate of melting point 68° (from petroleum ether, medium boiling).

EXAMPLE 30

Tablets containing the following ingredients were prepared according to conventional tabletting procedures:

| Ingredient: | Amount, mg. |
|---|---|
| 2,4-dichloro-β-methoxy-phenethyl-N-isopropyl-carbamate | 100 |
| D-(—)-mannitol | 150 |
| Maize starch | 270 |
| Silicic acid, precipitated | 45 |
| Talc | 30 |
| Magnesium stearate | 5 |

We claim:
1. 2,4-dichloro-β-lower alkoxy-phenethyl N-allyl-carbamate.
2. 2,4-dichloro-β-lower alkoxy-phenethyl 1-piperidino-carboxylate.
3. 2,4-dichloro-β-(2-propynyloxy)-phenethyl N-isopropyl carbamate.
4. 2,4-dichloro-β-(2-propynyloxy)-phenethyl-1-piperidino carboxylate.

References Cited

UNITED STATES PATENTS

| | | | |
|---|---|---|---|
| 2,708,194 | 5/1955 | Blicke | 260—239 |
| 3,265,728 | 8/1966 | Bossinger et al. | 260—482 |
| 3,313,692 | 4/1967 | Bossinger et al. | 167—65 |
| 3,334,096 | 8/1967 | Szarvasi et al. | 260—247.2 |

HENRY R. JILES, Primary Examiner

G. T. TODD, Assistant Examiner

U.S. Cl. X.R.

260—247.2, 268, 468, 471, 482, 570.7, 611, 999